US010510999B2

United States Patent
Yoo et al.

(10) Patent No.: US 10,510,999 B2
(45) Date of Patent: Dec. 17, 2019

(54) CELL COVER FOR SECONDARY BATTERY HAVING BOTTOM SURFACE CONFORMING TO A COOLING PLATE, AND BATTERY MODULE COMPRISING SAME

(71) Applicant: LG CHEM, LTD., Seoul (KR)

(72) Inventors: Ha-Neul Yoo, Daejeon (KR); Jong-Soo Ha, Daejeon (KR); Sang-Il Son, Daejeon (KR); Yun-Ki Choi, Daejeon (KR); Hang-June Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 113 days.

(21) Appl. No.: 15/553,644

(22) PCT Filed: Jun. 14, 2016

(86) PCT No.: PCT/KR2016/006308
§ 371 (c)(1),
(2) Date: Aug. 25, 2017

(87) PCT Pub. No.: WO2016/204489
PCT Pub. Date: Dec. 22, 2016

(65) Prior Publication Data
US 2018/0047954 A1 Feb. 15, 2018

(30) Foreign Application Priority Data
Jun. 16, 2015 (KR) .................. 10-2015-0085423

(51) Int. Cl.
*H01M 2/10* (2006.01)
*H01M 10/6556* (2014.01)
(Continued)

(52) U.S. Cl.
CPC ....... *H01M 2/1016* (2013.01); *H01M 2/1072* (2013.01); *H01M 2/1077* (2013.01);
(Continued)

(58) Field of Classification Search
CPC .......... H01M 10/6555; H01M 2/0217; H01M 2/1016; H01M 2/1077
See application file for complete search history.

(56) References Cited

U.S. PATENT DOCUMENTS

| 4,323,156 A | * | 4/1982 | Grueneberg | ......... B65D 5/5004 |
| | | | | 206/703 |
| 5,836,478 A | * | 11/1998 | Weiss | ..................... B65D 5/725 |
| | | | | 221/309 |

(Continued)

FOREIGN PATENT DOCUMENTS

| DE | 10 2011 004 033 A1 | 8/2012 |
| DE | 10 2012 101 141 A1 | 8/2013 |

(Continued)

OTHER PUBLICATIONS

International Search Report for PCT/KR2016/006308 (PCT/ISA/210) dated Sep. 27, 2016.

*Primary Examiner* — Imran Akram
(74) *Attorney, Agent, or Firm* — Birch, Stewart, Kolasch & Birch, LLP

(57) ABSTRACT

According to an aspect of the present disclosure, there is provided a cell cover for a secondary battery, which accommodates at least one secondary battery in an internal space and is mounted in a groove formed on a top surface of a cooling plate having an uneven plate shape, the cell cover including a first side plate and a second side plate facing each other to form opposite side surfaces of the internal space, a top plate forming a top surface of the internal space and connecting upper edges of the first side plate and the second side plate, and a first bottom plate extending from a lower edge of the first side plate and a second bottom plate extending from a lower edge of the second side plate to face the first bottom plate, the first bottom plate and the second bottom plate forming a bottom surface of the internal space, (Continued)

(a)

(b)

in which the first bottom plate and the second bottom plate are inclined downwardly at an angle with respect to a horizontal plane, respectively.

16 Claims, 7 Drawing Sheets

(51) Int. Cl.
*H01M 10/625* (2014.01)
*H01M 10/647* (2014.01)
*H01M 10/6551* (2014.01)
*H01M 10/6555* (2014.01)
*H01M 10/613* (2014.01)

(52) U.S. Cl.
CPC ....... *H01M 10/613* (2015.04); *H01M 10/625* (2015.04); *H01M 10/647* (2015.04); *H01M 10/6551* (2015.04); *H01M 10/6555* (2015.04); *H01M 10/6556* (2015.04); *H01M 2220/20* (2013.01)

(56) References Cited

U.S. PATENT DOCUMENTS

| | | | | |
|---|---|---|---|---|
| 5,927,502 A | * | 7/1999 | Hunter | B65D 71/48 206/194 |
| 6,902,062 B1 | * | 6/2005 | Kumakura | B65D 5/725 206/443 |
| 9,991,569 B2 | | 6/2018 | Jin | |
| 2002/0157986 A1 | * | 10/2002 | Bowers | B65D 5/4608 206/703 |
| 2005/0069760 A1 | * | 3/2005 | Somatomo | H01M 2/0404 429/56 |
| 2011/0206983 A1 | * | 8/2011 | Hano | H01M 2/0235 429/166 |
| 2012/0040235 A1 | * | 2/2012 | Cho | H01M 2/0207 429/156 |
| 2012/0208051 A1 | * | 8/2012 | Tsukiji | H01M 2/0235 429/56 |
| 2015/0122569 A1 | * | 5/2015 | Miyashiro | H01M 2/1083 180/220 |
| 2015/0171492 A1 | | 6/2015 | Ramsayer et al. | |

FOREIGN PATENT DOCUMENTS

| | | |
|---|---|---|
| EP | 1 278 263 A2 | 1/2003 |
| JP | 2013-62023 A | 4/2013 |
| JP | 2015-50057 A | 3/2015 |
| KR | 10-2013-0021794 A | 3/2013 |
| KR | 10-2014-0142770 A | 12/2014 |
| KR | 10-2015-0020174 A | 2/2015 |
| WO | WO 2014/035160 A1 | 3/2014 |

* cited by examiner

PRIOR ART

CELL COVER FOR SECONDARY BATTERY HAVING BOTTOM SURFACE CONFORMING TO A COOLING PLATE, AND BATTERY MODULE COMPRISING SAME

TECHNICAL FIELD

The present application claims priority to Korean Patent Application No. 10-2015-0085423 filed on Jun. 16, 2015 in the Republic of Korea, the disclosure of which is incorporated herein by reference.

The present disclosure relates to a cell cover for a secondary battery, and more particularly, to a cell cover for a secondary battery, which accommodates a secondary battery therein to protect the secondary battery and guides stacking of secondary batteries, and a battery module including the cell cover.

BACKGROUND ART

Secondary batteries commercially used at the present include nickel-cadmium batteries, nickel-hydrogen batteries, nickel-zinc batteries, lithium secondary batteries or the like, among which the lithium secondary batteries are in the limelight due to their very low self-discharge rate, high energy density, and free charging/discharging since a memory effect does not substantially occur in comparison to nickel-based secondary batteries.

Such a lithium secondary battery mainly uses lithium-based oxide and a carbon material as a cathode active material and an anode active material, respectively. The lithium secondary battery includes an electrode assembly, which includes a cathode plate coated with the cathode active material, an anode plate coated with the anode active material, and a separator interposed therebetween, and an outer casing, i.e., a battery case, to accommodate with a hermetic seal the electrode assembly therein along with an electrolyte solution.

Generally, lithium secondary batteries may be classified, depending on a shape of a battery casing, into can shaped secondary batteries in which an electrode assembly is embedded in a metal casing and pouch-type secondary batteries in which an electrode assembly is embedded in a pouch of an aluminum laminate sheet.

Recently, secondary batteries have been extensively used in electric vehicles securing power using an internal combustion engine and/or an electric motor as well as in small devices such as portable electronic devices. The electric vehicles include a hybrid vehicle, a plug-in hybrid vehicle, a purely electric vehicle powered by only an electric motor and a battery without an internal combustion engine, and so forth.

For use in the electric vehicle, a number of secondary batteries are electrically connected to increase capacity and output. Especially for medium and large devices, a pouch-type secondary battery is mostly used due to its easy stacking.

However, the pouch-type secondary battery does not have high mechanical strength because it is generally packed with a battery case including a laminate sheet of aluminum and polymer resin. Thus, when a battery module includes multiple pouch-type secondary batteries, a cell cover is used to protect the secondary batteries from an external shock, etc., to prevent movement of the secondary batteries, and to facilitate stacking of the secondary batteries.

Meanwhile, if the temperature of a secondary battery rises higher than a proper temperature, the secondary battery may undergo performance deterioration, and in the worst case, may explode or catch fire. In particular, when a battery module is made by stacking multiple pouch-type secondary batteries, the temperature of the battery module may rise more quickly and drastically due to buildup of heat produced from the multiple secondary batteries in a small space. Moreover, a battery module included in a vehicle battery pack is likely to be often exposed to direct sunlight and to be in a high-temperature condition such as the summer season, a desert region, or the like.

Therefore, when a battery module includes multiple secondary batteries, it is very important to stably and effectively cool the secondary batteries. FIG. 1 illustrates a contact structure between a cell cover and a cooling plate and a heat transfer path according to a related art.

As illustrated in FIG. 1, a conventional battery module accommodates a secondary battery B and includes a cell cover 1 and a cooling plate 2 supporting the cell cover 1. The cooling plate 2 in the shape of an uneven plate includes a groove 3 on a top surface thereof, and the cell cover I is mounted in the groove 3.

Although not shown, a heat sink may be positioned under the cooling plate 2. Heat generated in the secondary battery B is transferred to the cooling plate 2 along a plate surface of the cell cover 1, and heat absorbed by the cooling plate 2 is transferred to the heat sink. The heat sink may be cooled by a coolant flowing along an internal flow path.

Meanwhile, in such a battery module, to improve cooling efficiency, it is necessary to secure a sufficient contact area between the cell cover 1 and the cooling plate 2, and a cell cover may not be closely mounted on a conventional cooling plate due to a manufacturing tolerance of the cooling plate. Especially when a surface of the groove 3 of the cooling plate 2 is not flat or even, a bottom of the cell cover 1 and the surface of the groove 3 may not completely contact each other. As a result, a gap is generated between the bottom of the cell cover I and the surface of the groove 3, increasing thermal contact resistance and thus lowering cooling efficiency.

DISCLOSURE

Technical Problem

The present disclosure is designed to solve the problems of the related art, and therefore the present disclosure is directed to providing a cell cover capable of closely contacting a cooling plate having a tolerance.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a cell cover for a secondary battery, which accommodates at least one secondary battery in an internal space thereof and is mounted in a groove formed on a top surface of a cooling plate having an uneven plate shape, the cell cover including a first side plate and a second side plate facing each other to form opposite side surfaces of the internal space, a top plate forming a top surface of the internal space and connecting upper edges of the first side plate and the second side plate, and a first bottom plate extending from a lower edge of the first side plate and a second bottom plate extending from a lower edge of the second side plate to face the first bottom plate, the first bottom plate and the second bottom plate forming a bottom surface of the internal space, in which the first bottom plate and the second bottom plate are inclined downwardly at an angle with respect to a horizontal plane, respectively.

When the first bottom plate and the second bottom plate are in an inclined shape, an end portion of the first bottom plate and an end portion of the second bottom plate may be spaced apart from each other.

The first bottom plate and the second bottom plate may include a flexible material to be changed in shape according to a shape of the groove when the first bottom plate and the second bottom plate are mounted in the groove.

At least one of the first bottom plate and the second bottom plate may include at least one cut portion that is cut in parallel with a widthwise direction of the groove.

The cell cover may further include a support member placed in the internal space to support the first side plate and the second side plate to maintain an interval between the first side plate and the second side plate.

The support member may include an upper support member placed to contact a bottom surface of the top plate and a lower support member placed above the first bottom plate and the second bottom plate to face the upper support member.

The top plate may include a first top plate extending from an upper edge of the first side plate and a second top plate extending from an upper edge of the second side plate to face the first top plate, and the first top plate and the second top plate may be detachably coupled to each other.

In another aspect of the present disclosure, there is also provided a battery module including the above-described cell cover for a secondary battery.

In another aspect of the present disclosure, there is also provided a vehicle including the above-described battery module. The vehicle may be any one of an electric vehicle, a hybrid electric vehicle, and a plug-in hybrid electric vehicle.

Advantageous Effects

According to an aspect of the present disclosure, a cell cover capable of closely contacting a cooling plate having a tolerance is provided. Therefore, heat transfer between the cell cover and the cooling plate is facilitated, thereby improving the cooling efficiency of the battery cell.

According to another aspect of the present disclosure, a contact area between the cell cover and the cooling plate may be sufficiently secured, thus removing a need to use an additional component such as a thermal interface material (TIM) and thus reducing a unit cost of production of a product.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Figure 1:
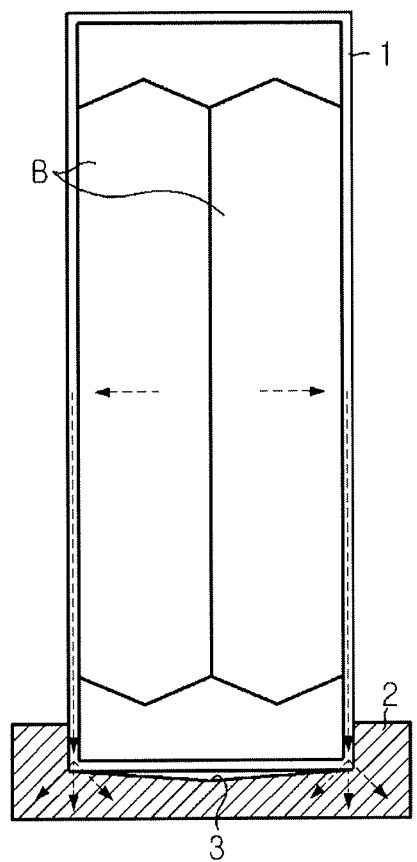
FIG. 1 illustrates a contact structure between a cell cover and a cooling plate and a heat transfer path according to a related art.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Hereinafter, embodiments will be described with reference to the accompanying drawings. The terms or words used in the description and claims below should not be interpreted as only general or dictionary meanings, but interpreted as meanings and concepts satisfying the technical spirit of the present disclosure based on a principle in that the inventor can appropriately define his/her disclosure with a concept of the terms in order to describe the disclosure in the best method.

Therefore, since embodiments described in the present specification and configurations shown in the drawings are merely exemplary embodiments of the present disclosure and do not represent all of the technical spirit of the present disclosure, it should be understood that there may be various equivalents and modified examples that can replace the embodiments described in the present specification and the configurations shown in the drawings at the time of filling the present application.

Moreover, a detailed description of well-known functions or elements associated with the present disclosure will be omitted if it obscures the subject matter of the present disclosure.

The embodiments of the present disclosure are provided to those of ordinary skill in the art to describe the present disclosure more completely, and therefore, shapes and sizes of elements shown in the drawings may be exaggerated, omitted, or schematically shown for clear description. Thus, the size or rate of each element does not entirely reflect the actual size or rate of the element.

A cell cover for a secondary battery is used when a battery module is configured by stacking and packing one or more secondary batteries, and refers to a component that prevents movement of a secondary battery by holding the secondary battery and is stacked with another cell cover to guide assembly of secondary batteries.

A secondary battery cell cover 10 according to an embodiment of the present disclosure includes a metal material such as aluminum, etc., and has an internal space in the shape of a box that is approximately rectangular parallelepiped to accommodate a secondary battery B therein. Herein, the secondary battery B may be a pouch-type secondary battery. The pouch-type secondary battery has low mechanical strength because an outer casing thereof includes a metal layer and a resin layer, whereas the cell cover 10 makes up for such a mechanical strength of the pouch-type secondary battery. The secondary battery cell cover 10 absorbs heat produced from the secondary battery B and radiates the heat to outside. In particular, the secondary battery cell cover 10 according to the present disclosure is designed to minimize thermal contact resistance with respect to a cooling plate 20 having an uneven surface due to tolerance. This will be described in detail with reference to FIGS. 2 through 4.

Figure 2:
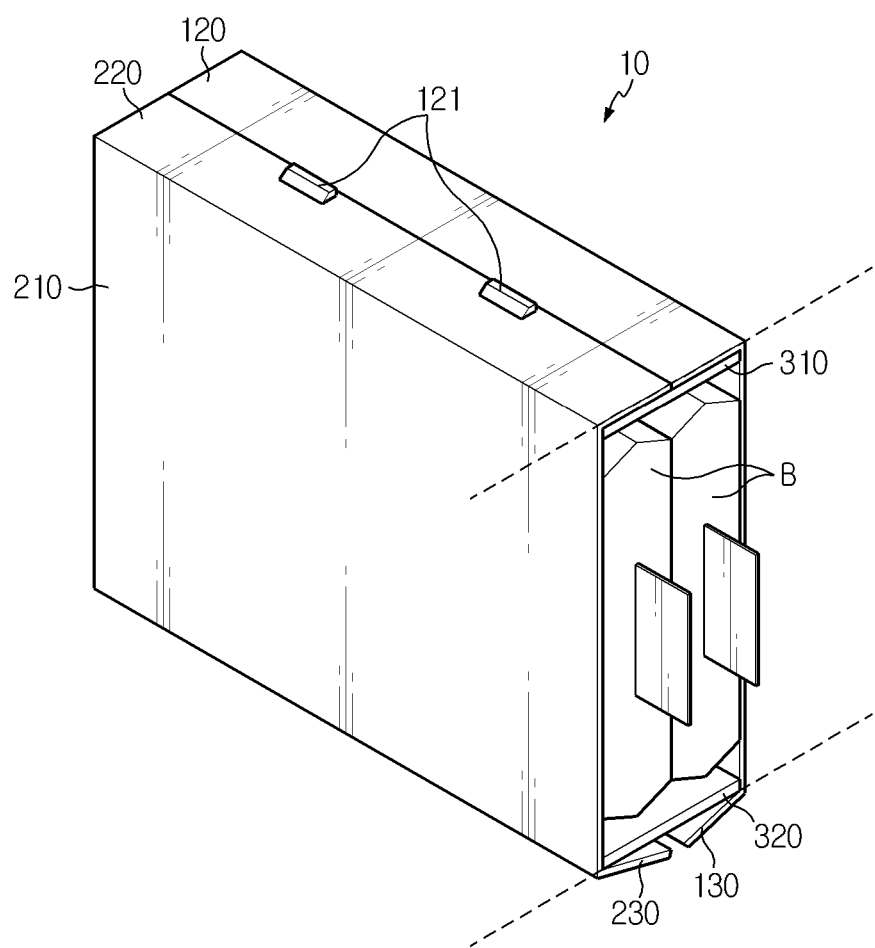
FIG. 2 is a perspective view of a cell cover according to an embodiment of the present disclosure.
Figure 3:
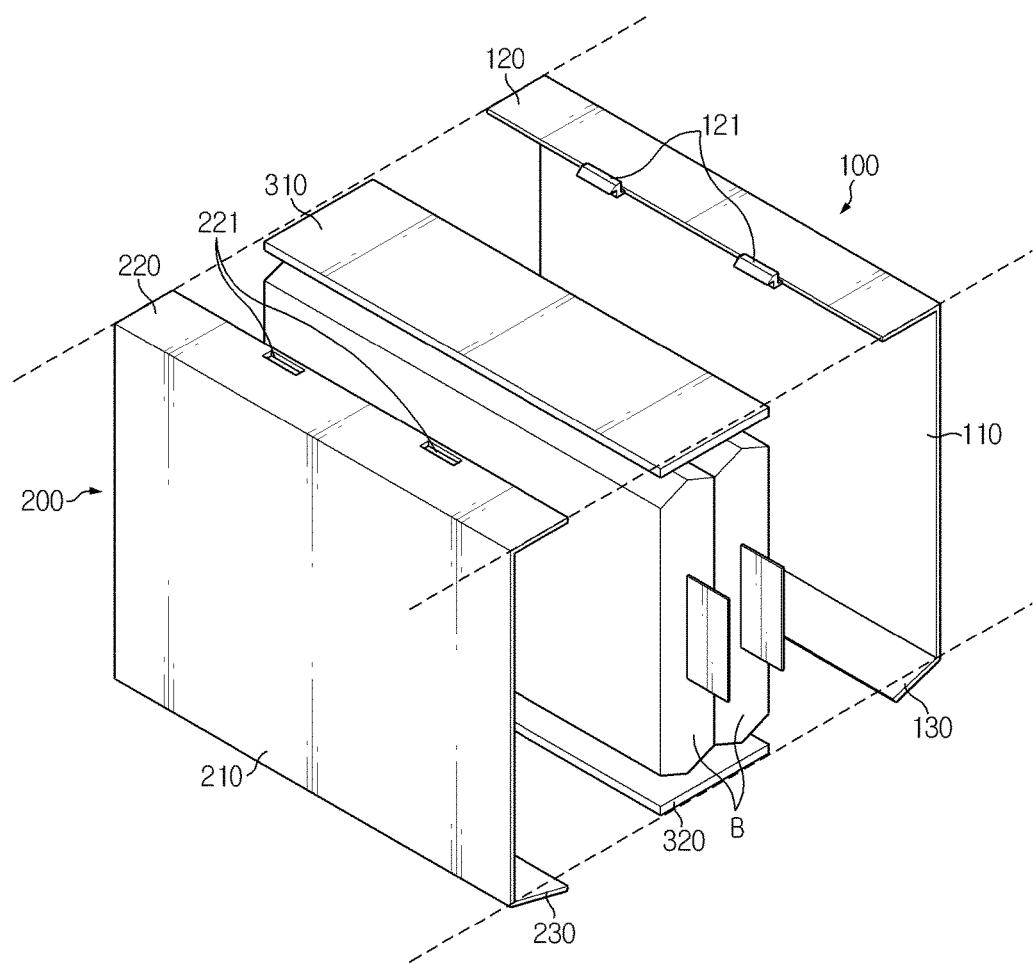
FIG. 3 is an exploded perspective view of FIG. 2.
Figure 4:
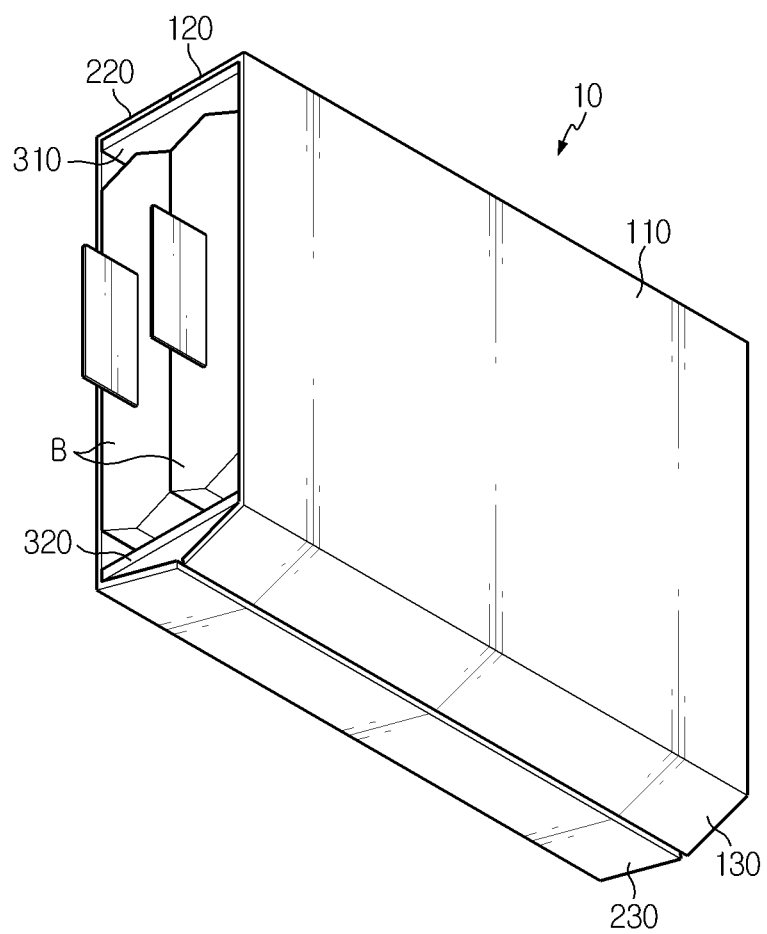
FIG. 4 is a perspective view of a cell cover of FIG. 2, when viewed from the bottom.

FIG. 2 is a perspective view of a cell cover according to an embodiment of the present disclosure, FIG. 3 is an exploded perspective view of FIG. 2, and FIG. 4 is a perspective view of a cell cover of FIG. 2, when viewed from the bottom.

Referring to these drawings, the secondary battery cell cover 10 according to the present disclosure has an approximately rectangular parallelepiped shape in which a front surface and a back surface are open and an internal space is provided. That is, the secondary battery cell cover 10 may include a first side plate 110 and a second side plate 210 that face each other to form opposite side surfaces of the internal space, top plates 120 and 220 that form a top surface of the internal space and connect upper edges of the first side plate 110 and the second side plate 210, respectively, and bottom plates 130 and 230 that form a bottom surface of the internal space.

The top plates 120 and 220 according to the current embodiment may include a first top plate 120 and a second top plate 220. The first top plate 120 and the second top plate 220 may include hooks 121 and hook engagement holes 221, respectively, which may be engaged with each other in a hooking manner.

The bottom plates 130 and 230 according to the current embodiment may include a first bottom plate 130 and a second bottom plate 230. The first bottom plate 130 extends from lower edges of the first side plate 110, and the second bottom plate 230 extends from lower edges of the second side plate 210 to face the first bottom plate 130. In particular, as shown in FIGS. 2 through 4, the first bottom plate 130 and the second bottom plate 230 are inclined downwardly at an angle with respect to a horizontal plane, respectively, and end portions thereof are spaced apart from each other. The first bottom plate 130 and the second bottom plate 230 will be described in more detail later for convenience.

The first side plate 110, the second side plate 210, the top plates 120 and 220, and the bottom plates 130 and 230 are conceptually divided elements, and all or some of them may be mutually assembled or integrally molded.

For example, in the current embodiment, the secondary battery cell cover 10 may include a first unit cell cover 100 and a second unit cell cover 200 as shown in FIG. 3. The first unit cell cover 100 and the second unit cell cover 200 are integrally formed. Herein, the first unit cell cover 100 includes the first top plate 120, the first side plate 110, and the first bottom plate 130, which are integrated thereinto, and the second unit cell cover 200 includes the second top plate 220, the second side plate 210, and the second bottom plate 230, which are integrated thereinto. The first unit cell cover 100 and the second unit cell cover 200 are detachably coupled to each other by engaging the first top plate 120 and the second top plate 220 with each other in the hooking manner.

The secondary battery B may be densely disposed in the internal space of the secondary battery cell cover 10. That is, the secondary battery B may be disposed and fixed such that a surface of an outer casing contacts the first side plate 110 or the second side plate 210. An electrode lead portion may be exposed to outside through the open front surface or back surface of the cell cover 10. By interconnecting electrode leads exposed to outside through a bus bar (not shown), secondary battery B cells may be connected in series or in parallel.

Describing reception of the secondary battery B in brief, for example, secondary batteries B are settled such that they are overlapped on each other one by one in the first unit cell cover 100, and then the second unit cell cover 200 is covered with the first unit cell cover 100, and the hooks 121 of the first top plate 120 and the second top plate 220 are engaged with each other, thus accommodating two secondary batteries B in the internal space of the cell cover 10.

Figure 5:
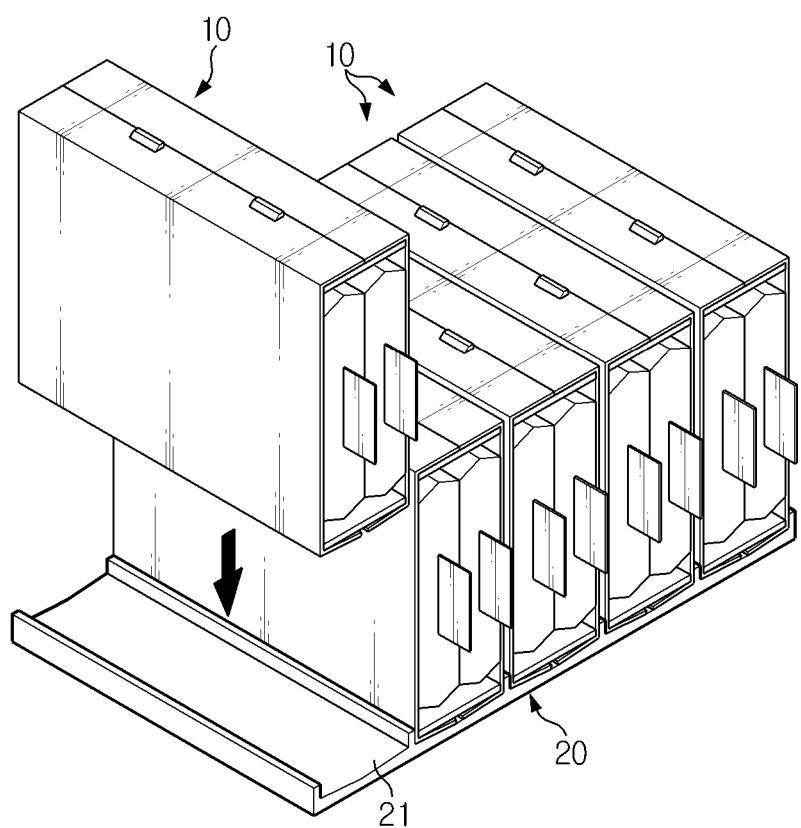
FIG. 5 is a perspective view schematically showing that a cell cover according to an embodiment of the present disclosure is mounted on a cooling plate.
Figure 6:
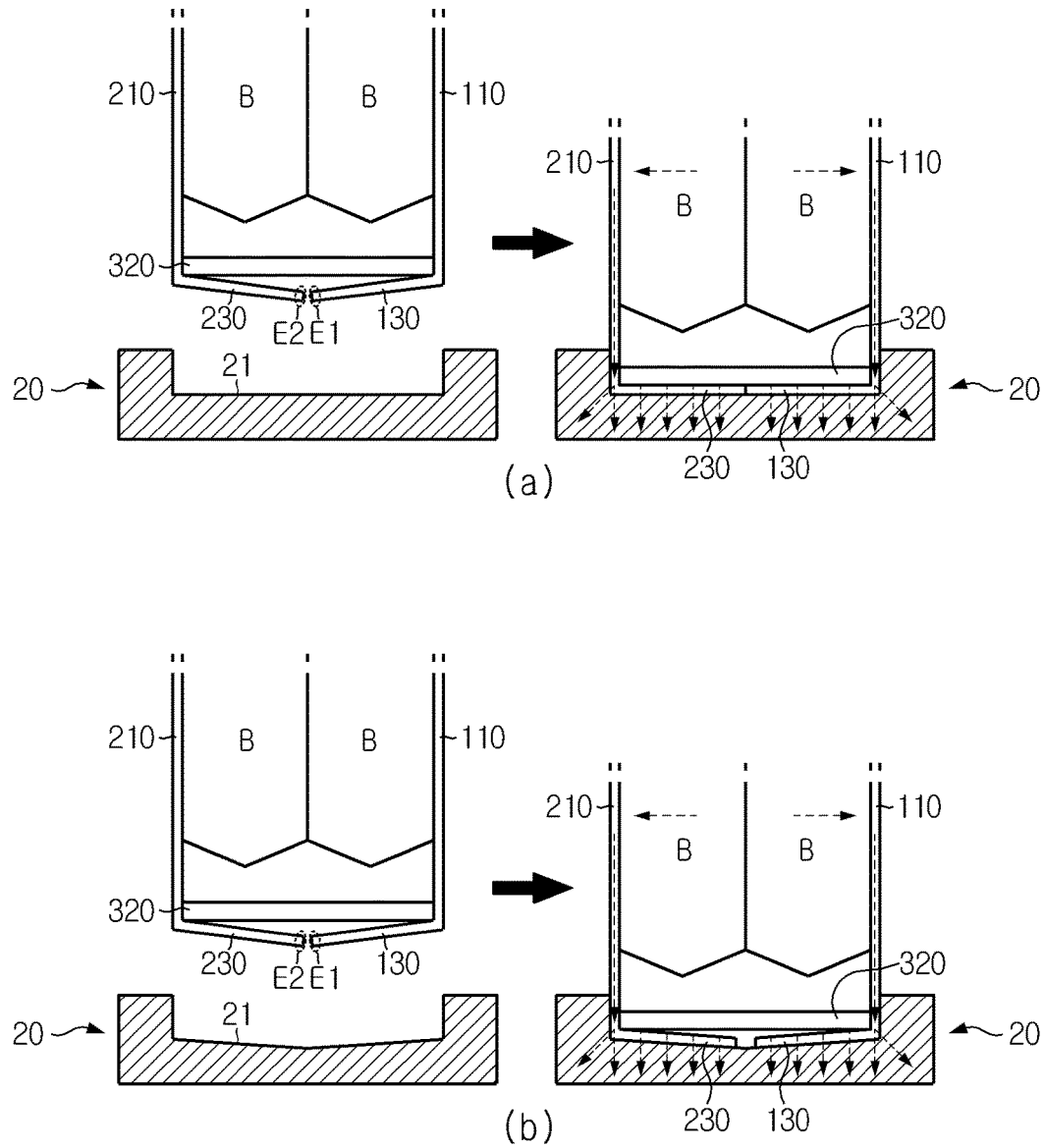
FIG. 6 illustrates a contact structure between a cell cover and a cooling plate and a heat transfer path according an embodiment of the present disclosure.

FIG. 5 is a perspective view schematically showing that the cell cover 10 according to an embodiment of the present disclosure is mounted on the cooling plate 20, and FIG. 6 illustrates a contact structure between a cell cover and a cooling plate and a heat transfer path according an embodiment of the present disclosure, and FIG. 6 illustrates a contact structure between the cell cover 10 and the cooling plate 20 and a heat transfer path according an embodiment of the present disclosure.

Referring to FIG. 5. the secondary battery cell cover 10 may be mounted on the cooling plate 20. The cooling plate 20 includes a plurality of grooves 21 on a top surface thereof in the shape of an uneven plate to support a plurality of cell covers 10 on an upper portion thereof. In the battery module, the plurality of secondary battery cell covers 10 are inserted into the grooves 21, respectively, to stand up on the upper portion of the cooling plate 20. Herein, the cooling plate 20 includes a thermally conductive metal plate to absorb heat of the cell covers 10. Although not shown, a heat sink (not shown) may be positioned under the cooling plate 20. The heat sink means an object that absorbs and radiates heat from another object by thermal contact. For example, the heat sink may include a hollow structure having an internal flow path through which a refrigerant such as a coolant, cooling gas, air, etc. With this structure, referring to a flow line of heat shown in FIG. 6, heat generated in the secondary batteries B is absorbed by the first side plate 110 and the second side plate 210 of the cell cover 10, then is conducted to the first bottom plate 130 and the second bottom plate 230, and then is transferred to the cooling plate 20 contacting the first bottom plate 130 and the second bottom plate 230. The cooling plate 20 is cooled by the heat sink. Thus, the cooling performance of the battery module largely depends on a heat transfer rate between the cell cover 10 and the cooling plate 20, and to increase the heat transfer rate, a contact area between the cell cover 10 and the cooling plate 20 needs to be sufficiently secured.

To this end, the secondary battery cell cover 10 according to an embodiment of the present disclosure may be provided such that the first bottom plate 130 and the second bottom plate 230 are inclined downwardly at an angle with respect to the horizontal plane, as shown in FIGS. 2, 4, and 6. Herein, the angle may be determined based on an average shape of the groove 21 due to tolerance in manufacturing of the cooling plate 20. The first bottom plate 130 and the second bottom plate 230, unlike the top plates 120 and 220, are separated from each other such that an end portion E1 of the first bottom plate 130 and an end portion E2 of the second bottom plate 230 are spaced apart from each other. The cell cover 10 including the first bottom plate 130 and the second bottom plate 230 may include an aluminum material that has high heat conductivity and is flexible. Thus, once the cell cover 10 is inserted into the groove 21 such that the bottom plates 130 and 230 of the cell cover 10, that is, the first bottom plate 130 and the second bottom plate 230 are directed toward the groove 21 of the cooling plate 20, the first bottom plate 130 and the second bottom plate 230 may be changed in shape according to the shape of the groove 21.

More specifically, referring to (a) of FIG. 6, if the cell cover 10 is inserted into the groove 21 of the cooling plate 20 having no tolerance, the first bottom plate 130 and the second bottom plate 230 may closely contact the surface of the groove 21 due to their flexibility. That is, as the first bottom plate 130 and the second bottom plate 230 are hit against the flat surface of the groove 21 and are folded, the inclined shape of the first bottom plate 130 and the second bottom plate 230 may be changed to a flat shape. In other words, the first bottom plate 130 may be folded in a counterclockwise direction axially along the lower edge of the first side plate 110 and the second bottom plate 230 is folded in a clockwise direction axially along the lower edge of the second side plate 210, such that the first bottom plate 130 and the second bottom plate 230 closely contact the surface of the groove 21. By allowing the end portion E1 of the folded first bottom plate 130 and the end portion E2 of the folded second bottom plate 230 to contact each other, heat may be transferred without a gap on the bottom surface of the cell cover 10.

Meanwhile, the groove 21 of the cooling plate 20 may have an uneven surface that is gently concave or convex due to tolerance. The cell cover 10 according to the current embodiment may be mounted such that the bottom surface of the cell cover 10 is in closely contact with the groove 21 of the cooling plate 20 having such tolerance. That is, referring to (b) of FIG. 6, in spite of the groove 21 of the slightly concave surface, when the cell cover 10 is completely inserted into the groove 21, the inclined shape of the first bottom plate 130 and the second bottom plate 230 are not changed to the extent more than the first bottom plate 130 and the second bottom plate 230 contact the concave surface of the groove 21. Thus, the bottom plates 130 and 230 of the cell cover 10 may contact the groove 21 of the cooling plate 20 as closely as possible. For reference, although not shown, for the groove 21 of the convex surface, when the cell cover 10 is mounted, the first bottom plate 130 and the second bottom plate 230 may be changed in shape to closely contact the convex surface of the groove 21, and thus, also in this case, the bottom plates 130 and 230 of the cell cover 10 may closely contact the surface of the groove 21.

In this way, in the secondary battery cell cover 10 according to the present disclosure, the bottom plates 130 and 230 are inclined downwardly at an angle with respect to the horizontal plane, such that the bottom plates 130 and 230, even when assembled with the cooling plate 20 including the groove 21 having an uneven surface due to tolerance, may be flexibly changed in shape. Thus, a contact resistance between the cell cover 10 and the cooling plate 20 may be significantly reduced. In addition, according to the current embodiment, without a thermal contact resistance enhancement member such as a thermal interface material (TIM), etc., an empty gap space between the cell cover 10 and the cooling plate 20 may be removed and a heat transfer area may be sufficiently secured.

Referring to FIGS. 2 and 3, the secondary battery cell cover 10 according to an embodiment of the present disclosure may further include a support member 300 in the internal space to support the first side plate 110 and the second side plate 210 such that an interval between the first side plate 110 and the second side plate 210 is maintained constant.

The support member 300 may be a plate of a plastic material having high mechanical strength. However, the scope of the present disclosure is not limited to the foregoing example. That is, the support member 300 is not specially limited in shape or material as long as the support member 300 maintains the shape of the cell cover 10.

The support member 310 and 320 reinforces the mechanical strength of the first unit cell cover 100 and the second unit cell cover 200 of an aluminum material and absorbs an external shock, thus preventing the interval between the first side plate 110 and the second side plate 210 from being narrowed. The support member 300 may also support the first side plate 110 and the second side plate 210 to prevent the cell cover 10 absorbing heat from being easily changed in shape. As the internal space of the cell cover 10 is maintained constant, the secondary batteries B may be stably protected.

In the current embodiment, the support member 300 may include an upper support member 310 placed to contact the bottom surfaces of the top plates 120 and 220 and a lower support member 320 placed above the first bottom plate 130 and the second bottom plate 230.

That is, the upper support member 310 is placed to contact three surfaces of the first and second side plates 110 and 210 and the top plates 120 and 220 to support the top plates 120 and 220 as well as to maintain the interval between the first and second side plates 110 and 210.

The lower support member 320 is placed under the upper support member 310 having the secondary batteries B therebetween. In the current embodiment, the lower support member 320 is placed on lower edge regions of the first and second side plates 110 and 210. The lower support member 320 may guide horizontal folding of the first bottom plate 130 and the second bottom plate 230 when the cell cover 10 is inserted into the flat surface of the groove 21. That is, in the current embodiment, a folding angle of the first bottom plate 130 and the second bottom plate 230 is limited by the lower support member 320. Unlike in the current embodiment, a position of the lower support member 320 may be changed not to limit the folding angle of the first bottom plate 130 and the second bottom plate 230. For example, for the groove 21 of the convex surface, the lower support member 320 may be placed higher than shown in FIG. 6 considering the folding angle of the first bottom plate 130 and the second bottom plate 230.

Another embodiment of the present disclosure to be described below corresponds to FIG. 4 when compared to the previous embodiment. Like reference numerals refer to like members, and a repeated description of identical members will not be avoided.

Figure 7:
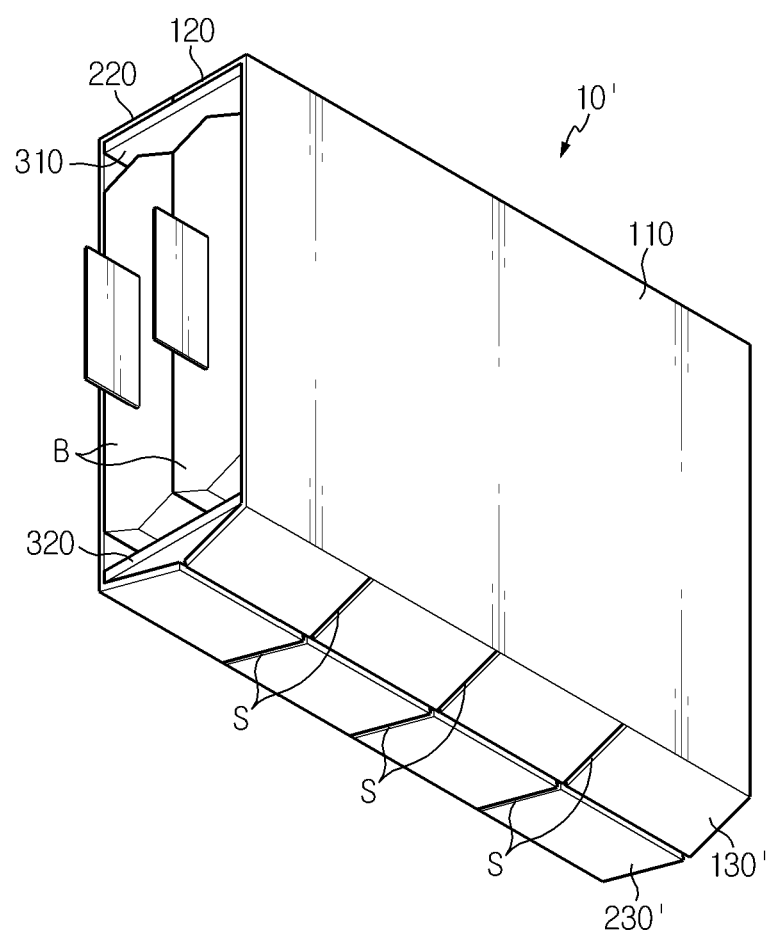
FIG. 7 is a perspective view of a cell cover according to another embodiment of the present disclosure, when viewed from the bottom.

FIG. 7 is a perspective view of a cell cover 10' according to another embodiment of the present disclosure, when viewed from the bottom.

The current embodiment is similar to the previous embodiment except for a bottom plate, and thus the following description will focus on a difference from the previous embodiment.

As shown in FIG. 7, bottom plates 130' and 230' of the cell cover 10' according to the current embodiment are structured, like in the previous embodiment, such that the first bottom plate 130' and the second bottom plate 230' are separated from each other and inclined, but the first bottom plate 130' and the second bottom plate 230' further include at least one cut portions S being cut in parallel with the widthwise direction of the groove 21 of the cooling plate 20.

That is, in the current embodiment, the first bottom plate 130' and the second bottom plate 230' are cut into several regions, such that when the cell cover 10' is mounted in the groove 21, the first bottom plate 130' and the second bottom plate 230' may be separately changed in shape from cut unit region to cut unit region according to an undulating or uneven shape of the groove 21. For example, the groove 21 of the cooling plate 20 may have a longitudinally undulating surface due to tolerance. The cell cover 10' according to the current embodiment may effectively contact, especially, the undulating groove 21. That is, since the bottom plates 130' and 230' are folded to different extents from unit region to unit region according to the undulating surface of the groove 21, a gap between the bottom plates 130' and 230' and the surface of the groove 21 may be reduced and a contact area therebetween may increase when compared to a case where the first bottom plate 130' and the second bottom plate 230' are changed in shape together. As a result, the contact area between the cell cover 10' and the cooling plate 20 may be sufficiently secured, increasing a heat transfer rate and thus improving cooling efficiency.

The battery module according to the present disclosure may include the above-described secondary battery cell cover and cooling plate according to the present disclosure. The battery module may further include not only the secondary battery cell cover and the cooling plate, but a case for covering them and various devices for controlling charging/discharging secondary batteries, such as a battery management system (BMS), an electric current sensor, a fuse, etc.

The battery module according to the present disclosure may be applied to a vehicle such as an electric vehicle or a hybrid vehicle. That is, a vehicle according to the present disclosure may include the battery module according to the present disclosure.

While exemplary embodiments of the present disclosure have been described so far, the present disclosure is not limited to the above-described specific embodiments, and it would be obvious to those of ordinary skill in the art that various modifications may be made without departing from the subject matter of the present disclosure claimed in the appended claims and such modifications fall within the scope of the disclosure of the claims.

Meanwhile, in the present specification, a term indicating a direction such as up, down, left, right, etc., has been used, but the term is merely for convenience of description and it would be obvious to those of ordinary skill in the art that the term may be expressed differently depending on a viewing position of a viewer, a position where a target is placed, or the like.

What is claimed is:

1. A battery module, comprising:
    a cell cover for a secondary battery, which accommodates at least one secondary battery in an internal space; and
    a cooling plate,
    wherein the cell cover comprises:
        a first side plate and a second side plate facing each other to form opposite side surfaces of the internal space;
        a top plate forming a top surface of the internal space and connecting upper edges of the first side plate and the second side plate; and
        a first bottom plate extending from a lower edge of the first side plate and a second bottom plate extending from a lower edge of the second side plate to face the first bottom plate, the first bottom plate and the second bottom plate forming a bottom surface of the internal space,
    wherein a top surface of the cooling plate comprises a groove, the first bottom plate and the second bottom plate of the cell cover contacting the groove,
    wherein the lower edge of the first side plate and the lower edge of the second side plate are in a first plane, and
    wherein the first bottom plate and the second bottom plate are inclined downwardly at an angle with respect to the first plane.

2. The battery module of claim 1, wherein when the first bottom plate and the second bottom plate are in an inclined shape, an end portion of the first bottom plate and an end portion of the second bottom plate are spaced apart from each other.

3. The battery module of claim 1, wherein the first bottom plate and the second bottom plate comprise a flexible material to be changed in shape according to a shape of the groove of the cooling plate when the first bottom plate and the second bottom plate are mounted in the groove of the cooling plate.

4. The battery module of claim 1, wherein at least one of the first bottom plate and the second bottom plate comprises at least one cut portion that is cut in parallel with a widthwise direction of the groove of the cooling plate.

5. The battery module of claim 1, further comprising a support member placed in the internal space to support the first side plate and the second side plate to maintain an interval between the first side plate and the second side plate.

6. The battery module of claim 5, wherein the support member is provided in a plate shape, and
    the support member comprises an upper support member placed to contact a bottom surface of the top plate and a lower support member placed above the first bottom plate and the second bottom plate to face the upper support member.

7. The battery module of claim 1, wherein the first side plate, the second side plate, the top plate, the first bottom plate and the second bottom plate are formed of metal.

8. The battery module of claim 5, wherein the support member is formed of plastic, and
    wherein the first side plate, the second side plate, the top plate, the first bottom plate and the second bottom plate are formed of metal.

9. The battery module of claim 5, wherein the support member is provided at the lower edge of the first side plate and the lower edge of the second side plate.

10. The battery module of claim 5, wherein a material of the support member is different than a material of the cell cover.

11. The battery module of claim 10, wherein the support member is formed of plastic.

12. The battery module of claim 1, wherein the top plate comprises a first top plate extending from an upper edge of the first side plate and a second top plate extending from an upper edge of the second side plate to face the first top plate, and
    the first top plate and the second top plate are detachably coupled to each other.

13. The battery module of claim 1, further comprising:
at least one secondary battery,
wherein the cell cover surrounds the at least one secondary battery.

14. A vehicle comprising:
an electric motor; and
the battery module of claim 13.

15. The battery module of claim 7, wherein the metal is aluminum.

16. The battery module of claim 1, wherein the first bottom plate is configured to fold about the lower edge of the first side plate independent of folding of the second bottom plate about the lower edge of the second side plate.

* * * * *